US012103850B2

(12) United States Patent
Nguyen et al.

(10) Patent No.: US 12,103,850 B2
(45) Date of Patent: Oct. 1, 2024

(54) METHOD OF FORMING GRAPHENE

(71) Applicant: Samsung Electronics Co., Ltd., Suwon-si (KR)

(72) Inventors: Van Luan Nguyen, Suwon-si (KR); Keunwook Shin, Yongin-si (KR); Hyeonjin Shin, Suwon-si (KR); Changhyun Kim, Seoul (KR); Changseok Lee, Gwacheon-si (KR); Yeonchoo Cho, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 935 days.

(21) Appl. No.: 17/060,893

(22) Filed: Oct. 1, 2020

(65) Prior Publication Data
US 2021/0163296 A1  Jun. 3, 2021

(30) Foreign Application Priority Data
Dec. 3, 2019 (KR) .................. 10-2019-0159352

(51) Int. Cl.
*B32B 9/00* (2006.01)
*C01B 32/186* (2017.01)
(52) U.S. Cl.
CPC ........... *C01B 32/186* (2017.08); *Y10T 428/30* (2015.01)

(58) Field of Classification Search
USPC .......................................... 428/408; 423/448
See application file for complete search history.

(56) References Cited

U.S. PATENT DOCUMENTS

| 2010/0003462 | A1  | 1/2010  | Kamins et al. |
| 2012/0136601 | A1* | 5/2012  | Chen ....................... H01L 22/12 |
|              |     |         | 702/81 |
| 2013/0189444 | A1  | 7/2013  | Kub et al. |
| 2015/0050482 | A1* | 2/2015  | Ruoff ....................... C30B 25/18 |
|              |     |         | 428/220 |
| 2018/0083220 | A1* | 3/2018  | Moon ................... H10K 50/816 |
| 2019/0161351 | A1  | 5/2019  | Song et al. |
| 2019/0322532 | A1* | 10/2019 | Kim ......................... C23C 16/01 |

FOREIGN PATENT DOCUMENTS

KR   10-2019-0063369 A    6/2019

* cited by examiner

*Primary Examiner* — Daniel H Miller
(74) *Attorney, Agent, or Firm* — HARNESS, DICKEY & PIERCE, P.L.C.

(57) ABSTRACT

A method of forming graphene includes: preparing a substrate in a reaction chamber; performing a first growth process of growing a plurality of graphene aggregates apart from each other on the substrate at a first growth rate by using a reaction gas including a carbon source; and performing a second growth process of forming a graphene layer by growing the plurality of graphene aggregates at a second growth rate slower than the first growth rate by using the reaction gas including the carbon source.

24 Claims, 17 Drawing Sheets

FIG. 15

| GROWTH TYPE | D width (cm$^{-1}$) | D'/G | 2D/G |
|---|---|---|---|
| FAST GROWTH | 40 | 1.3 | 0.15 |
| SLOW GROWTH | 28 | 0.3 | 0.65 |
| 2-STEP GROWTH | 26 | 0.3 | 1.5 |

FIG. 16

| GROWTH TYPE | RESISTANCE(Ω) (BEFORE ANNEALING) | RESISTANCE(Ω) (AFTER ANNEALING) | REDUCTION RATE OF RESISTANCE VALUE(%) |
|---|---|---|---|
| FAST GROWTH | 7.09 | 25.65 | −261.77 |
| SLOW GROWTH | 7.23 | 26.10 | −260.99 |
| 2-STEP GROWTH | 6.39 | 5.7 | 10.8 |

METHOD OF FORMING GRAPHENE

CROSS-REFERENCE TO RELATED APPLICATION

This application claims the benefit of Korean Patent Application No. 10-2019-0159352, filed on Dec. 3, 2019, in the Korean Intellectual Property Office, the disclosure of which is incorporated herein in its entirety by reference.

BACKGROUND

1. Field

The present disclosure relates to a method of forming graphene, and more particularly, to a method of forming graphene directly on a substrate.

2. Description of Related Art

In the semiconductor device field, resistance increases as the width of metal wiring decreases. Graphene is being actively researched in the semiconductor device field and research is being done to develop a new metal barrier material. Graphene is a material that has a hexagonal honeycomb structure in which carbon atoms are connected two-dimensionally, and has a very small thickness at the atomic size. Such graphene has advantages of high electric mobility, excellent thermal characteristics, chemical stability, and a large surface area, as compared to silicon (Si).

Meanwhile, as a method of forming graphene on a substrate, there is a graphene direct growth method of growing graphene directly on a non-catalyst substrate. In order to apply graphene to a semiconductor device, when graphene is directly grown on a non-catalyst substrate in a low-temperature environment, induction of diffusion of a carbon source is not easy due to the low-temperature environment, and thus it may be difficult to form graphene having uniform flatness.

SUMMARY

Provided are high quality graphene layers having uniform flatness on a substrate.

Additional aspects will be set forth in part in the description which follows and, in part, will be apparent from the description, or may be learned by practice of the presented embodiments of the disclosure.

According to an embodiment, a method of forming graphene includes preparing a substrate in a reaction chamber; performing a first growth process of growing a plurality of graphene aggregates apart from each other on the substrate at a first growth rate, the first growth process using a reaction gas including a carbon source; and performing a second growth process of forming a graphene layer by growing the plurality of graphene aggregates at a second growth rate slower than the first growth rate, the second growth process using the reaction gas including the carbon source.

In some embodiments, the carbon source in the first growth process has a first partial pressure and the carbon source in the second growth process has a second partial pressure. The first partial pressure and the second partial pressure may be different from each other.

In some embodiments, the first partial pressure may be greater than the second partial pressure.

In some embodiments, a coverage of the plurality of graphene aggregates on the substrate grown in the first growth process may be in the range of 10% to 80%.

In some embodiments, the reaction gas may further include at least one of an inert gas and a hydrogen gas.

In some embodiments, in the second growth process, at least one of the inert gas and the hydrogen gas may be further injected into the reaction chamber.

In some embodiments, a process pressure in the first growth process may be less than a process pressure in the second growth process.

In some embodiments, a process pressure in the first growth process may be less than or equal to the process pressure in the second growth process and in the range of 0.01 mTorr to 20 mTorr.

In some embodiments, the first growth process and the second growth process may be performed under a plasma enhanced chemical vapor deposition (PECVD) process.

In some embodiments, the plasma may be generated by at least one radio frequency (RF) plasma generator or at least one microwave (MW) plasma generator.

In some embodiments, the first growth process and the second growth process may be performed at a process temperature of 200° C. to 700° C.

In some embodiments, the substrate may include a non-catalyst substrate including a material other than a material that acts as a catalyst for the growth of a graphene aggregate.

In some embodiments, the substrate may include at least one of a group IV semiconductor material, a semiconductor compound, and an insulating material.

In some embodiments, the substrate may further include a dopant.

In some embodiments, the substrate may include a material in which at least two elements are combined among Si, Ge, C, Zn, Cd, Al, Ga, In, B, C, N, P, S, Se, As, Sb, and Te.

In some embodiments, the substrate may include oxide of an element, a nitride of the element, and a carbide of the element, or a derivative of the element, and the element may include of at least one of Si, Ni, Al, W, Ru, Co, Mn, Ti, Ta, Au, Hf, Zr, Zn, Y, Cr, Cu, Mo and Gd.

In some embodiments, the carbon source may be hydrocarbon in a liquid state at room temperature.

In some embodiments, the hydrocarbon may include any one of methane, ethylene, acetylene, and propylene.

In some embodiments, the carbon source may include at least one of a molecular precursor including at least one aromatic molecular ring and a precursor including a functional group in a molecule having at least one aromatic molecular ring, and a molecular precursor including at least three aliphatic carbon bonds and a precursor including a functional group.

In some embodiments, the carbon source may include at least one of benzene, toluene, meta-xylene, propane, propene, butane, hexane, octane, cyclohexane, oxygen, nitrogen, sulfur, and phosphorus.

In some embodiments, the method of forming graphene may further include pretreating a surface of the non-catalyst substrate.

According to an embodiment, a method of forming graphene includes preparing a substrate in a reaction chamber to provide a prepared substrate; and forming a graphene layer on the prepared substrate by performing a plurality of growth processes on the prepared substrate in the reaction chamber using a reaction gas comprising a carbon source. The plurality of growth processes include a first growth process of growing a plurality of graphene aggregates on the prepared substrate at a first growth rate in the reaction chamber using the reaction gas. The plurality of growth processes include a second growth process after the first growth process. The second growth process includes growing the plurality of aggregates at a second growth rate in the reaction chamber using the reaction gas. The second growth rate is slower than the first growth rate.

In some embodiments, a partial pressure of the carbon source in the first growth process may be greater than a partial pressure of the carbon source in the second growth process.

In some embodiments, a process pressure in the first growth process may be less than a process pressure in the second growth process.

In some embodiments, the graphene layer may be formed during the second growth process.

In some embodiments, the first growth process and the second growth process may be performed at a process temperature of 200° C. to 700° C. using a plasma enhanced chemical vapor deposition (PECVD) process, and the reaction gas may further include at least one of an inert gas and a hydrogen gas.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 15 is a table comparing D peak widths, D'/G values, and 2D/G values when graphene is grown on a substrate through fast growth, when graphene is grown on a substrate through slow growth, and when graphene is grown on a substrate through two-step growth combining fast growth and slow growth;

FIG. 16 is a table comparing resistance changes of a metal/graphene/substrate structure when graphene is grown on a substrate through fast growth, when graphene is grown on a substrate through slow growth, and when graphene is grown on a substrate through two-step growth combining fast growth and slow growth.

DETAILED DESCRIPTION

Figure 1:
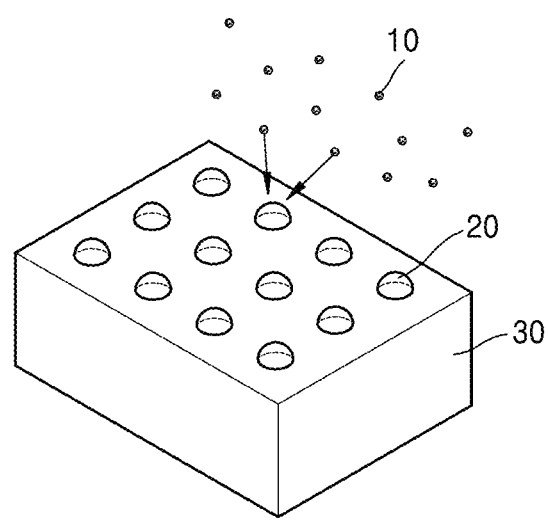
FIG. 1 is a perspective view of a state in which graphene aggregates are formed on a substrate according to a fast growth method.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements (e.g., A, B, and C), modify the entire list of elements and do not modify the individual elements of the list. For example, "at least one of A, B, and C," "at least one of A, B, or C," "one of A, B, C, or a combination thereof," and "one of A, B, C, and a combination thereof," respectively, may be construed as covering any one of the following combinations: A; B; A and B; A and C; B and C; and A, B, and C."

Hereinafter, a method of forming graphene according to various embodiments will be described in detail with reference to the accompanying drawings. The same reference numerals refer to the same elements throughout. In the drawings, the sizes of constituent elements may be exaggerated for clarity.

It will be understood that, although the terms first, second, etc. may be used herein to describe various elements, these elements should not be limited by these terms. These components are only used to distinguish one component from another. However, the method of forming graphene may be implemented in various forms and is not limited to the embodiments.

Throughout the specification, when a portion "includes" an element, another element may be further included, rather than excluding the existence of the other element, unless otherwise described.

Figure 2:
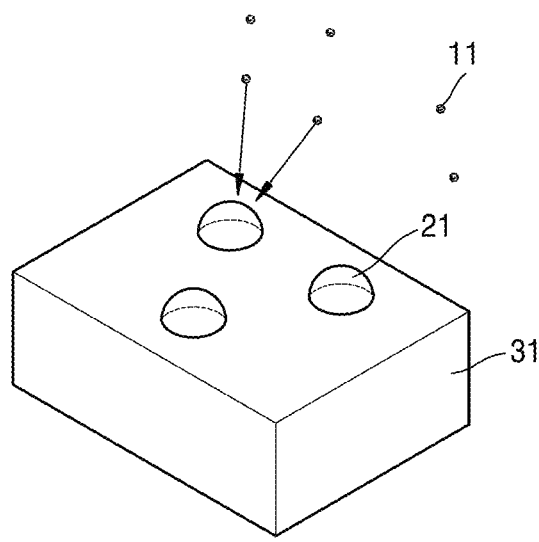
FIG. 2 is a perspective view of a state in which graphene aggregates are formed on a substrate according to a slow growth method.

In general, graphene is formed on a substrate by using a plasma enhanced chemical vapor deposition (PECVD) process. Graphene is formed under the PECVD process as follows. First, after preparing a substrate inside a vacuum reaction chamber, a reaction gas including a carbon source is injected into a chamber. The carbon source may be a source for supplying carbon for the growth of graphene. Thereafter, when power for generating plasma is applied to the reaction chamber, plasma of the reaction gas is generated inside the reaction chamber. In addition, activated carbons 10 and 11 are generated inside the reaction chamber by the plasma of the reaction gas as shown in FIGS. 1 and 2. For example, the activated carbons 10 and 11 may be carbon source radicals. The carbons 10 and 11 activated by the plasma of the reaction gas are adsorbed on surfaces of substrates 30 and 31. Graphene may be grown on the surfaces of the substrates 30 and 31 as the activated carbons 10 and 11 are continuously adsorbed on the surfaces of the substrates 30 and 31.

The method of forming graphene as described above may be classified into a fast growth method and a slow growth method according to partial pressure or process pressure of a carbon source. Hereinafter, fast growth and slow growth will be described with reference to FIGS. 1 and 2. FIG. 1 is a perspective view of a state in which a graphene aggregate 20 is formed on the substrate 30 according to the fast growth method. FIG. 2 is a perspective view of a state in which a graphene aggregate 21 is formed on the substrate 31 according to the slow growth method.

The fast growth method is a method of forming graphene at a relatively fast growth rate. In order to increase the growth rate of graphene, there is a method of increasing partial pressure of a carbon source included in a reaction gas. Alternatively, lowering process pressure may increase the growth rate of graphene. For example, referring to FIG. 1, the higher the partial pressure of the carbon source, the greater the amount of activated carbon 10 generated by plasma power over the same length of time. Accordingly, the number of graphene aggregates 20 sporadically formed by adsorbing activated carbon on the substrate 30 may be relatively great. Accordingly, the density of the graphene aggregate 20 may be relatively high. The graphene aggregate 20 may serve as a seed for forming a graphene layer. For example, a graphene layer may be formed by continuously growing the plurality of graphene aggregates 20, which are formed apart from each other on the substrate 30, until they contact with each other, by continuous growth in a lateral direction and a vertical direction due to the continuous supply of a carbon source. When the density of the graphene aggregate 20 is relatively high, a thin graphene layer may be formed. This is because a graphene layer may be formed even if vertical growth of the graphene aggregate 20 occurs relatively little when a distance between the graphene aggregates 20 is relatively narrow because the density of the graphene aggregate 20 is high. However, when the density of the graphene aggregate 20 is relatively high, lateral growth control of the graphene aggregate 20 may be difficult, and the diffusion barrier property of a graphene layer may be weakened.

The slow growth method is a method of forming graphene at a relatively slow speed. In order to reduce the growth rate of graphene, there is a method of lowering the partial pressure of the carbon source included in the reaction gas. Alternatively, increasing process pressure may reduce the growth rate of graphene. For example, referring to FIG. 2, the lower the partial pressure of the carbon source, the less the amount of activated carbon 11 generated by plasma power over the same time. Accordingly, the number of graphene aggregates 21 sporadically formed by adsorbing activated carbon on the substrate 31 may be relatively less. Accordingly, the density of the graphene aggregate 21 may be relatively low. When the density of the graphene aggregate 21 is relatively low, lateral growth control of the graphene aggregate 20 may be relatively easy. This is because when the density of the graphene aggregates 21 is low and a distance between them is great, lateral growth of the graphene aggregate 21 may occur better. However, when the density of the graphene aggregate 21 is relatively low, the thickness of graphene may be relatively thick. This is because vertical growth needs to occur relatively more until the plurality of graphene aggregates 21 are connected to each other to form a graphene layer.

Meanwhile, by appropriately combining the fast growth method and the slow growth method, high quality graphene having uniform flatness may be formed on the substrate. Hereinafter, with reference to FIGS. 3 to 13, a method of forming graphene of a two-step growth method according to an embodiment in which a fast growth method and a slow growth method are appropriately combined will be described. The method of forming graphene according to the embodiment may be performed at a process temperature of about 200° C. to about 700° C. For example, a method of forming graphene according to embodiments described later below may be performed at a process temperature of about 500° C.

Figure 3:
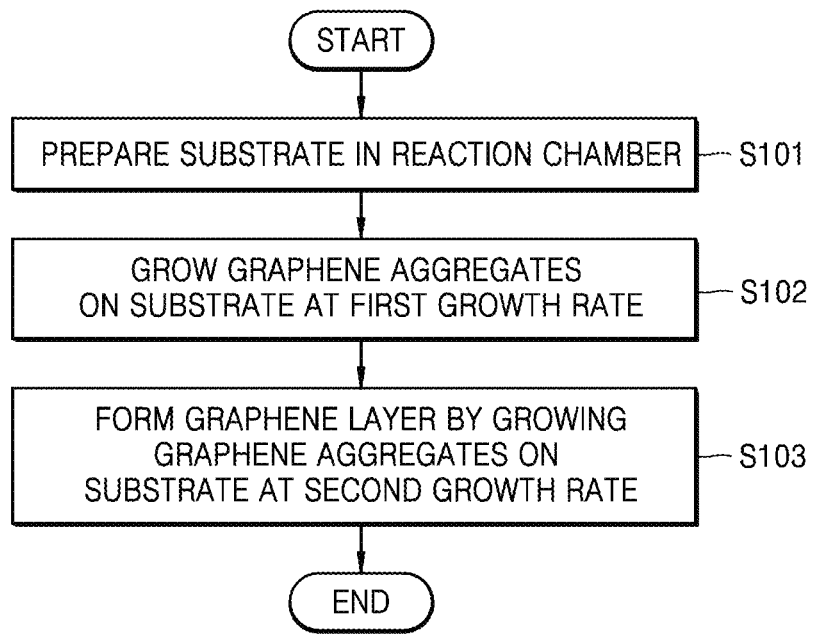
FIG. 3 is a flowchart of a method of forming graphene according to an embodiment.
Figure 4:
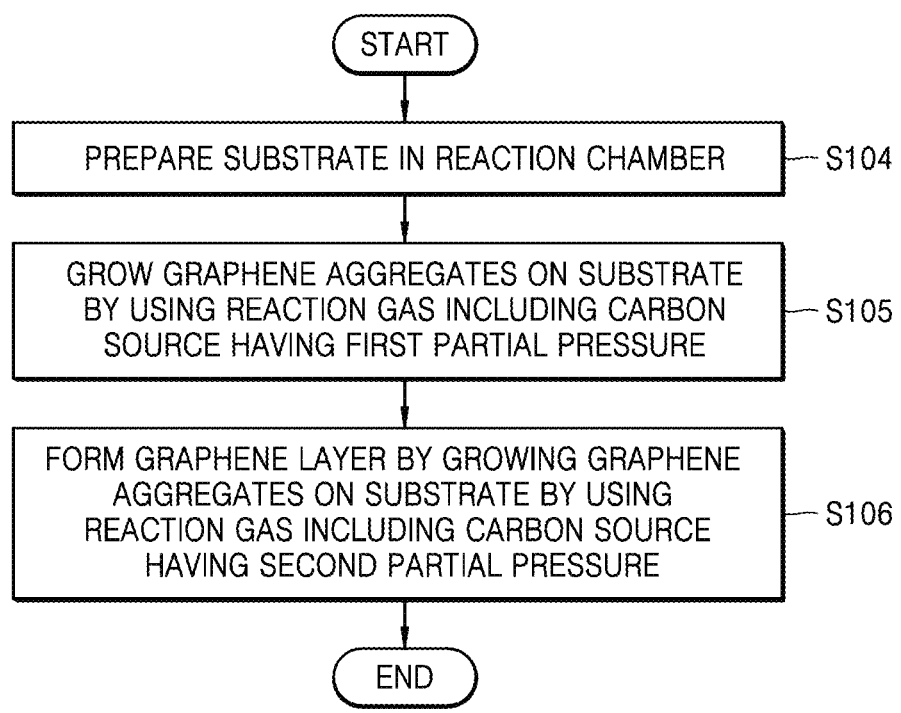
FIG. 4 is a flowchart of a method of forming graphene according to another embodiment.
Figure 5:
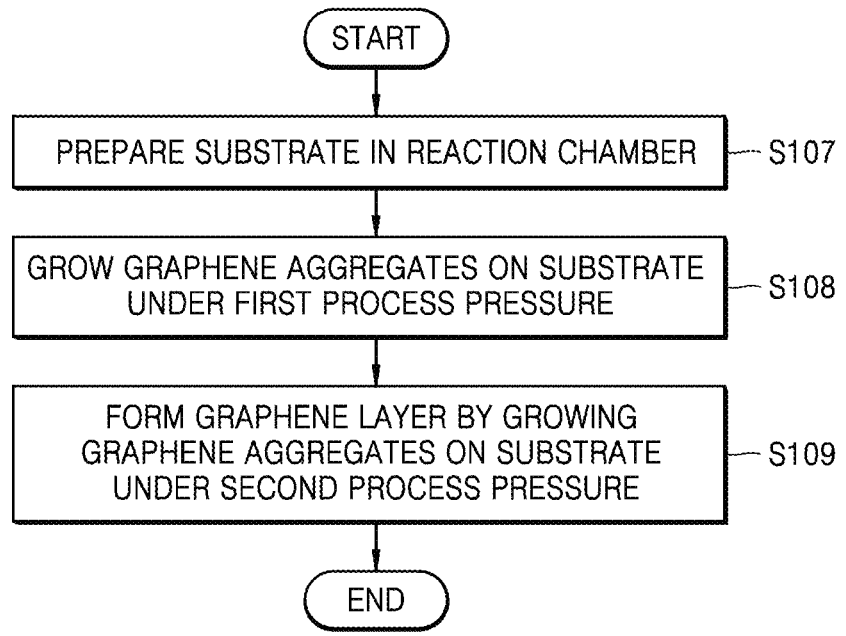
FIG. 5 is a flowchart of a method of forming graphene according to another embodiment.

FIG. 3 is a flowchart of a method of forming graphene according to an embodiment. FIG. 4 is a flowchart of a method of forming graphene according to another embodiment. FIG. 5 is a flowchart of a method of forming graphene according to another embodiment.

Referring to FIG. 3, the method of forming graphene may include a first process (operation S101) of preparing a substrate in a reaction chamber, a second process (operation S102) of growing a plurality of graphene aggregates apart from each other on the substrate at a first growth rate by using a reaction gas including a carbon source, and a third process (operation S103) of forming a graphene layer by growing the plurality of graphene aggregates at a second growth rate slower than the first growth rate by using the reaction gas including the carbon source. The second step (operation S102) and the third step (operation S103) may be referred to as a first growth step and a second growth step, respectively. After preferentially growing the plurality of graphene aggregates apart from each other on the substrate in the second step (operation S102), in the third step (operation S103), by growing the graphene aggregates at the second growth rate to form a graphene layer, it is possible to form a more flat and high quality graphene layer compared to forming graphene at the same rate throughout the process. In this case, the first growth rate may be faster than the second growth rate.

Meanwhile, the method for forming graphene may further include pretreating a surface of the substrate after preparing the substrate in a chamber and before the first growth step. Pretreatment of the substrate results in better adsorption of activated carbon on the substrate, leading to better graphene formation. In the pretreatment of the substrate, a pretreatment gas may be introduced into the chamber, and plasma of a pretreatment gas may be generated by applying power for plasma generation. Once the plasma of the pretreatment gas is generated, an activation site that induces adsorption of carbon may be formed on the surface of the substrate. In more detail, when gas plasma is generated in a process chamber into which the pretreatment gas is injected, certain charges may move towards the substrate and impinge on the surface of the substrate in the process chamber. Accordingly, the activation site capable of inducing carbon adsorption may be formed on the surface of the substrate. The pretreatment gas may include, for example, at least one of inert gas, hydrogen, oxygen, ammonia, chlorine, bromine, fluorine, and fluorocarbon. However, the disclosure is not limited thereto. The inert gas may include, for example, at least one of argon gas, neon gas, nitrogen gas, helium gas, krypton gas, and xenon gas. Meanwhile, plasma power applied in a pretreatment process of the substrate may be about 600 W or more. However, the disclosure is not limited thereto, and the plasma power applied in the pretreatment process of the substrate may be less than 600 W.

Referring to FIG. 4, the method of forming graphene according to another embodiment may include a first step (operation S104) of preparing a substrate in a reaction chamber, a second step (operation S105) of growing a graphene aggregate on the substrate by using a reaction gas including a carbon source having first partial pressure, and a third step (operation S106) of forming a graphene layer by growing the graphene aggregate on the substrate by using a reaction gas including a carbon source having a second partial pressure different from the first partial pressure. The second step (operation S105) and the third step (operation S103) may be referred to as a first growth step and a second growth step, respectively. For example, the first partial pressure may be greater than the second partial pressure. When using the carbon source having the first partial pressure, a growth rate of the graphene aggregate may be faster than when using the carbon source having the second partial pressure less than the first partial pressure.

Meanwhile, the method for forming graphene in FIG. 4 may further include pretreating a surface of the substrate after preparing the substrate in a reaction chamber (operation S104) and before growing a graphene aggregate on the substrate by using a reaction gas including a carbon source having first partial pressure (operation S105). The pretreating the surface of the substrate may be performed the same way as discussed above in the method of forming graphene in FIG. 3.

Referring to FIG. 5, the method of forming graphene according to another embodiment may include a first step (S107) of preparing a substrate in a reaction chamber, a second step (S108) of growing a graphene aggregate on the substrate using a reaction gas including a carbon source under first process pressure, and a third step (S109) of forming a graphene layer by growing the graphene aggregate on the substrate using the reaction gas including the carbon source under second process pressure greater than or equal to the first process pressure. The second step (operation S108) and the third step (operation S109) may be referred to as a first growth step and a second growth step, respectively. A growth rate of the graphene aggregate under the first process pressure may be faster than a growth rate of the graphene aggregate under the second process pressure.

Figure 6:
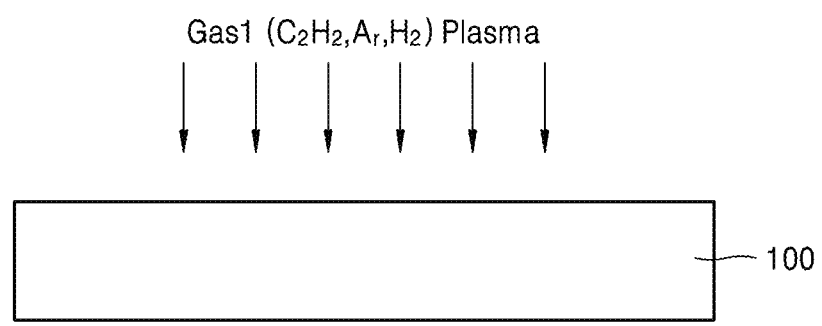
FIG. 6 is a view of a state in which a first reaction gas plasma is generated in a reaction chamber.
Figure 7:
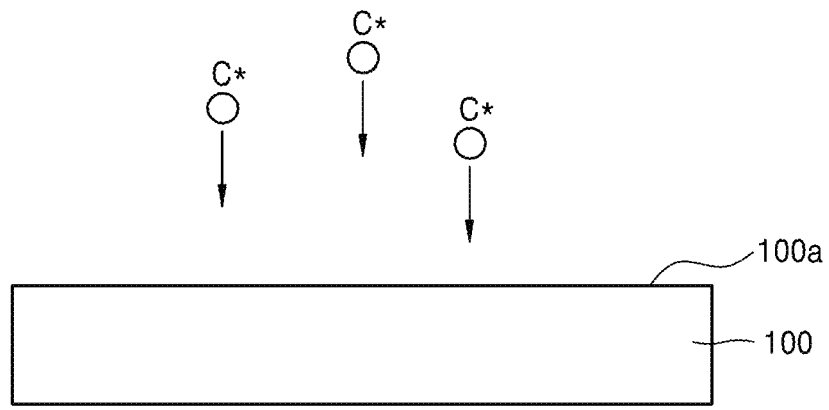
FIG. 7 is a view of a state in which carbon activated by a first reaction gas plasma is generated in a reaction chamber.
Figure 8:
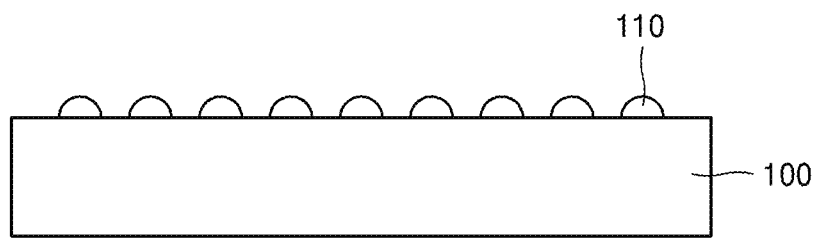
FIG. 8 is a view of a state in which a plurality of first graphene aggregates are formed on a substrate.

FIGS. 6 to 8 show methods of forming a first graphene aggregate 110 on a substrate 100 according to primarily growth steps (operations S102, S105, and S108).

Referring to FIG. 6, in the primarily growth steps (operations S102, S105, and S108), a first reaction gas Gas 1 for forming the first graphene aggregate 110 is injected into a reaction chamber (not shown) in which the substrate 100 is provided. The first reaction gas Gas 1 is a reaction gas having a carbon source having first partial pressure. The carbon source may be a source for supplying carbon for growth of the first graphene aggregate 110. The first partial pressure may be partial pressure that is relatively greater than second partial pressure to be described later below. Moreover, process pressure in the primarily growth steps (operations S102, S105, and S108) may be lower than or equal to process pressure in secondarily growth steps (operations S103, S106, and S109) to be described later below. For example, the process pressure in the primarily growth steps (operations S102, S105, and S108) may be lower than or equal to the process pressure in the secondarily growth steps (operations S103, S106, and S109) in the range of 0.01 mTorr to 10 mTorr. However, the disclosure is not limited thereto, and the process pressure in the primarily growth steps (operations S102, S105, and S108) may be lower than or equal to the process pressure in the secondarily growth steps (operations S103, S106, and S109) in the range of 0.01 mTorr to 20 mTorr. For example, the process pressure in the primarily growth steps (operations S102, S105, and S108) may be about 15 mTorr. Furthermore, plasma power for plasma generation may be applied inside the reaction chamber from a plasma source. Accordingly, plasma of the first reaction gas Gas 1 may be generated in the reaction chamber. In addition, the plasma power from the plasma source applied in a growth process of the first graphene aggregate 110 may be variously modified according to growth conditions of the first graphene aggregate 110. The plasma power may be included in the range of 10 W to 500 W. For example, the plasma power may be 300 W.

The substrate 100 may include, for example, a non-catalyst substrate. The non-catalyst substrate refers to a substrate including a material other than a material that acts as a catalyst for the growth of the first graphene aggregate 110. For example, the non-catalyst substrate may be a substrate that does not contain metal. The non-catalyst substrate may include at least one of a group IV semiconductor material, a semiconductor compound, and an insulating material. As a specific example, the group IV semiconductor material may include Si, Ge, or Sn. The semiconductor compound may include, for example, a material in which at least two elements are combined among Si, Ge, C, Zn, Cd, Al, Ga, In, B, C, N, P, S, Se, As, Sb, and Te. The insulating material may include at least one of Si, Al, Hf, Zr, Zn, Ti, Ta, W and Mn, or may include oxide, nitride, and carbide of at least one of Si, Ni, Al, W, Ru, Co, Mn, Ti, Ta, Au, Hf, Zr, Zn, Y, Cr, Cu, Mo and Gd, and derivatives thereof. At least one of the oxide, nitride, carbide, and derivatives thereof may further include H. Moreover, the substrate 100 may further include a dopant. The materials of the non-catalyst substrate mentioned above are examples, and may include a material that does not catalyze the growth of the first graphene aggregate 110.

The carbon source may include, for example, at least one of a hydrocarbon gas and a vapor of a liquid precursor including carbon, which is in a liquid state at room temperature.

For example, the liquid precursor may be a molecular precursor including one or more aromatic molecular rings such as benzene, toluene, xylene, mesitylene, or the like or a precursor including a molecule having one or more aromatic molecular rings, such as chlorobenzene or anisole (methyl phenyl ether), and a functional group.

Alternatively, the carbon source may include a molecular precursor including three or more aliphatic carbon bonds such as propane, propene, butane, hexane, octane, cyclohexane, or the like and a precursor including a functional group such as oxygen, nitrogen, sulfur, or the like. The hydrocarbon may include, for example, methane, ethylene, acetylene, or propylene. In addition, the liquid precursor including carbon may include, for example, benzene, toluene, xylene or anisole, hexane, octane, isopropyl alcohol, or ethanol. However, the above-mentioned carbon source materials are merely examples and various other materials may be used as a carbon source material.

The first reaction gas Gas 1 may further include at least one of an inert gas and a hydrogen gas. The inert gas may include, for example, at least one of an argon gas (Ar), neon gas (Ne), nitrogen gas (N), helium gas (He), krypton gas (Kr), and xenon gas (Xe). FIG. 6 as an example shows a case in which the first reaction gas Gas 1 includes a carbon source, an inert gas, and a hydrogen gas, an acetylene gas ($C_2H_2$) is used as the carbon source, and the argon gas (Ar) is used as the inert gas. Meanwhile, a mixing ratio of the first reaction gas Gas 1 injected into the reaction chamber may be variously modified according to the growth conditions of the first graphene aggregate 110. For example, a mixing ratio of the acetylene gas ($C_2H_2$), a hydrogen gas ($H_2$), and the argon gas (Ar) included in the first reaction gas Gas 1 having the carbon source having the first partial pressure may be 16:100:50.

As the plasma source, for example, an RF plasma generator or an MW plasma generator may be used. The RF plasma generator may generate, for example, an RF plasma having a frequency domain of about 3 MHz to about 100 MHz, and the MW plasma generator may generate, for example, MW plasma having a frequency domain of about 0.7 GHz to about 2.5 GHz. However, this frequency domain is merely illustrative and other frequency domains may be used. Meanwhile, a plurality of RF plasma generators or a plurality of MW plasma generators may be used as the plasma source.

Referring to FIG. 7, activated carbon C* may be formed inside the reaction chamber by the plasma of the first reaction gas Gas 1 generated by the plasma power. The activated carbon C* may be an active carbon radical. The activated carbon C* is adsorbed on a surface 100a of the substrate 100.

Referring to FIG. 8, the activated carbon C* may be adsorbed on the surface 100a of the substrate 100 to grow a plurality of first graphene aggregates 110 apart from each other on the substrate 100. The plurality of first graphene aggregates 110 may serve as seeds for forming a graphene layer. A grain size of the first graphene aggregate 110 may be 20 nm or less. However, the disclosure is not limited thereto, and the grain size of the first graphene aggregate 110 may be 30 nm or less.

As described above, when the first reaction gas Gas 1 including the carbon source having the first partial pressure is used, the plurality of first graphene aggregates 110 may be grown on the substrate 100 at the first growth rate. The growing of the first graphene aggregate 110 at the first growth rate may be referred to as a first growth step. The first growth step may continue until coverage of the first graphene aggregate 110 on the substrate 100 with respect to the substrate 100 is in the range of 10% to 80%.

FIGS. 9 to 13 show methods of forming second graphene aggregates 101, 102, and 103 on the substrate 100 according to the secondarily growth steps (operations S103, S106, and S109).

Figure 9:
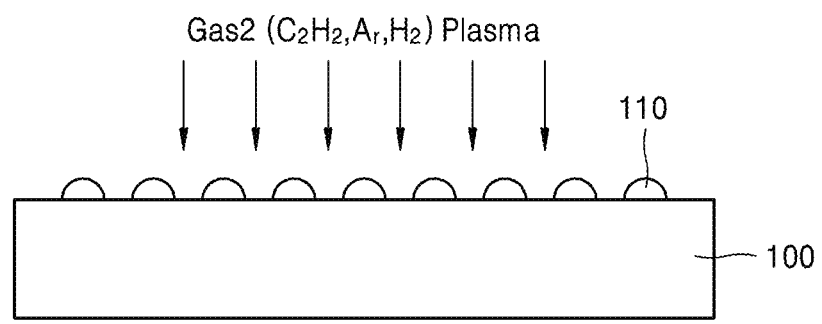
FIG. 9 is a view of a state in which a second reaction gas plasma is generated in a reaction chamber.

Referring to FIG. 9, in the secondarily growth steps (operations S103, S106, and S109), in order to grow the plurality of first graphene aggregates 110 formed on the substrate 100, the first reaction gas Gas 1 in a reaction chamber (not shown) may be changed to a second reaction gas Gas 2. The second reaction gas Gas 2 is a reaction gas having a carbon source having second partial pressure. The second partial pressure may be partial pressure that is relatively less than the first partial pressure. For example, partial pressure of a carbon source having the first reaction gas Gas 1 may be adjusted to change the first reaction gas Gas 1 to the second reaction gas Gas 2. The partial pressure of the carbon source may be adjusted by changing partial pressure of an inert gas or a hydrogen gas included in a reaction gas. For example, the partial pressure of the carbon source may be lowered by further injecting at least one of the inert gas and the hydrogen gas into a chamber. Moreover, process pressure in the secondarily growth steps (operations S103, S106, and S109) may be greater than or equal to process pressure in the primarily growth steps (operations S102, S105, and S108) in the range of 0.01 mTorr to 10 mTorr. However, the disclosure is not limited thereto, and the process pressure in the secondarily growth steps (operations S103, S106, and S109) may be greater than or equal to the process pressure in the primarily growth steps (operations S102, S105, and S108) in the range of 0.01 mTorr to 20 mTorr. For example, the process pressure in the secondarily growth steps (operations S103, S106, and S109) may be about 20 mTorr. Furthermore, plasma power for plasma generation may be applied inside the reaction chamber from a plasma source. Accordingly, plasma of the second reaction gas Gas 2 may be generated in the reaction chamber. The plasma power applied in the growth process of the first graphene aggregate 110 may be variously modified according to growth conditions of the first graphene aggregate 110. The plasma power may be included in the range of 10 W to 500 W. For example, the plasma power may be 300 W.

The second reaction gas Gas 2 may further include at least one of the inert gas and the hydrogen gas. Meanwhile, a mixing ratio of the second reaction gas Gas 2 injected into the reaction chamber may be variously modified according to the growth conditions of the first graphene aggregate 110. For example, a mixing ratio of the acetylene gas ($C_2H_2$), the hydrogen gas ($H_2$), and the argon gas (Ar) included in the second reaction gas Gas 2 having the carbon source having the second partial pressure may be 4:100:50.

Figure 10:
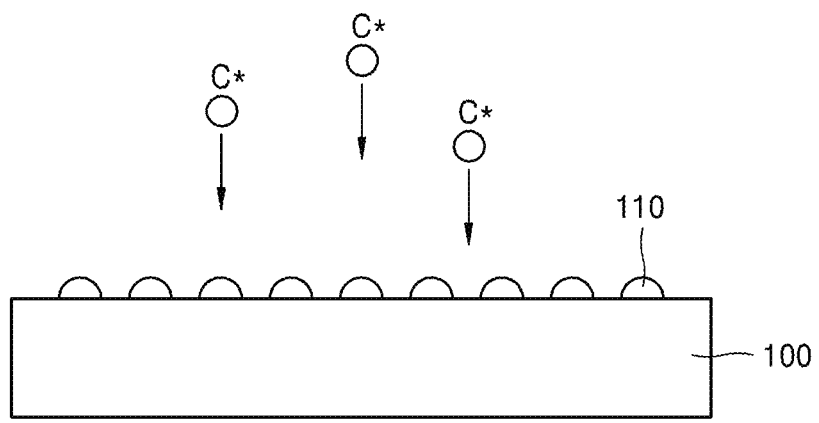
FIG. 10 is a view of a state in which carbon activated by a second reaction gas plasma is generated in a reaction chamber.

Referring to FIG. 10, the activated carbon C* may be formed inside the reaction chamber by the plasma of the second reaction gas Gas 2 generated by plasma power. In more detail, an activated carbon source radical may be formed inside a chamber. The activated carbon C*, that is, the active carbon radical is adsorbed on the surface 100a of the substrate 100. For example, the carbon source radical may be adsorbed on the first graphene aggregate 110. Accordingly, the first graphene aggregate 110 may grow in vertical and horizontal directions.

Figure 11:
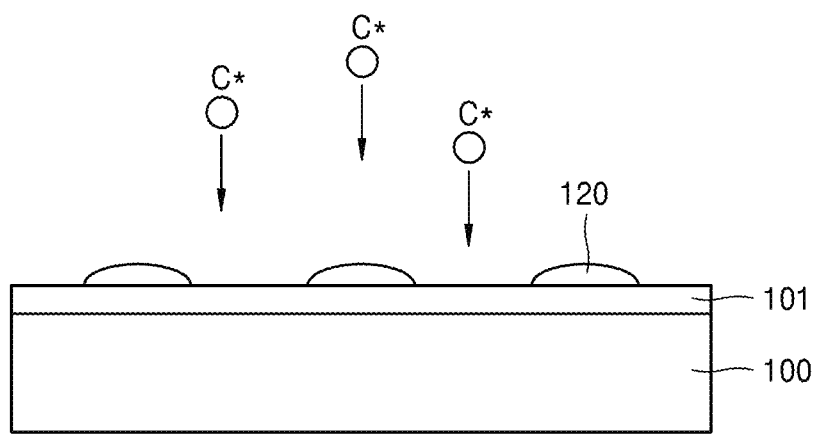
FIG. 11 is a view of a state in which a first graphene layer and second graphene aggregates are formed on a substrate.

Referring to FIG. 11, as the plurality of first graphene aggregates 110 grow in a horizontal direction, the plurality of first graphene aggregates 110 may be in contact with each other and thus a first graphene layer 101 may be formed. The activated carbon C* may be further adsorbed on the first graphene layer 101. Accordingly, a plurality of second graphene aggregates 120 may be formed on the first graphene layer 101. A grain size of a second graphene aggregate 120 may be greater than the grain size of the first graphene aggregate 110.

Figure 12:
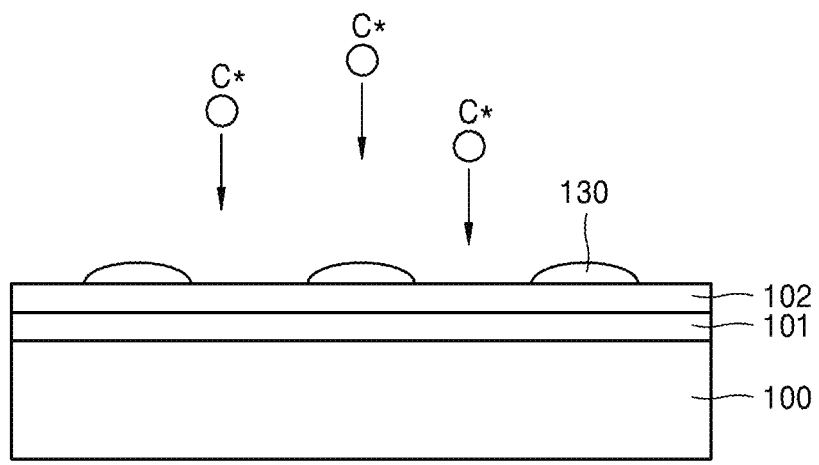
FIG. 12 is a view of a state in which a second graphene layer and third graphene aggregates are formed on a substrate.

Referring to FIG. 12, as the plurality of second graphene aggregates 120 grow in a horizontal direction, the plurality of second graphene aggregates 120 may be in contact with each other and thus the second graphene layer 102 may be formed. The activated carbon C* may be further adsorbed on the second graphene layer 102. Accordingly, a plurality of third graphene aggregates 130 may be formed on the second graphene layer 102. A grain size of a third graphene aggregate 130 may be greater than the grain size of the first graphene aggregate 110.

Figure 13:
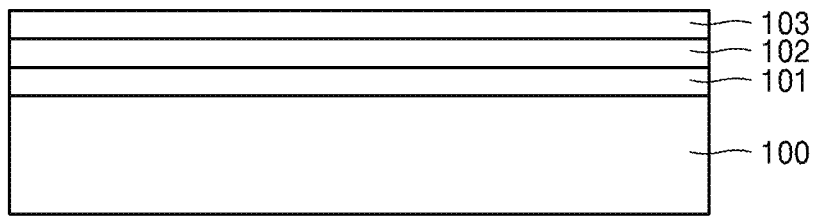
FIG. 13 is a view of a state in which third graphene aggregates are formed on a substrate.

Referring to FIG. 13, as the plurality of third graphene aggregates 130 grow in a horizontal direction, the plurality of third graphene aggregates 130 may be in contact with each other and thus a third graphene layer 103 may be formed.

As described above, when the second reaction gas Gas 2 including the carbon source having the second partial pressure is used, the plurality of first graphene aggregates 110 may be grown on the substrate 100 at a second growth rate. When the first graphene aggregate 110 is continuously grown at the second growth rate, the first, second, and third graphene layers 101, 102, and 103 may be sequentially formed. The growing of the first graphene aggregate 110 at such a second growth rate to form the first, second, and third graphene layers 101, 102, and 103 may be referred to as a second growth step.

Figure 14:
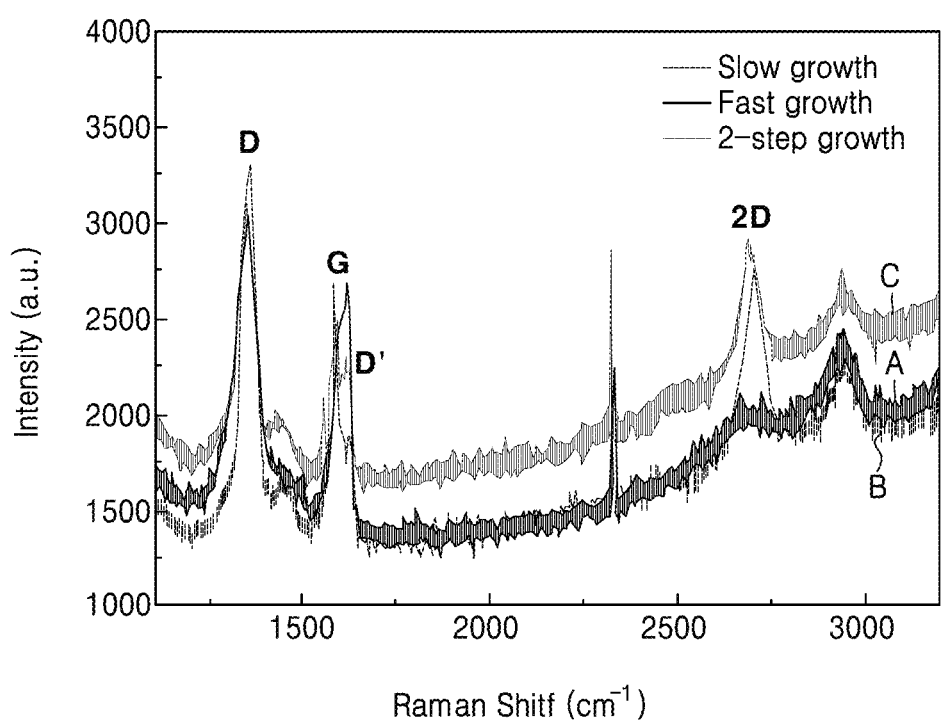
FIG. 14 is a graph showing a comparison of results of Raman analysis of the surface of a substrate when graphene is grown on the substrate through fast growth, when graphene is grown on the substrate through slow growth, and when graphene is grown on the substrate through two-step growth combining rapid growth and slow growth.

FIG. 14 is a view of the comparison of Raman analysis results on the surface of a substrate when graphene is grown on the substrate through fast growth, when graphene is grown on the substrate through slow growth, and when graphene is grown on the substrate through two-step growth combining fast growth and slow growth. FIG. 15 is a table comparing D peak widths, D'/G values, and 2D/G values when graphene is grown on a substrate through fast growth, when graphene is grown on a substrate through slow growth, and when graphene is grown on a substrate through two-step growth combining fast growth and slow growth. In general, in a Raman spectrum of graphene, a G peak may exist near 1590 cm$^{-1}$, a D peak may exist near 1350 cm$^{-1}$, and a 2D peak may exist near 2700 cm$^{-1}$. Furthermore, a D' peak may exist near 1600 cm$^{-1}$.

Referring to FIG. 14, widths of the D peak in a case of fast growth A and slow growth B may be greater than a width of the D peak in a case of two-step growth C. For example, as shown in the table of FIG. 15, in the case of the fast growth A and the slow growth B, the widths of the D peak may be about 40 cm$^{-1}$ and about 28 cm$^{-1}$, respectively. In addition, the width of the D peak in the case of the two-step growth C may be about 26 cm$^{-1}$. Meanwhile, it can be seen that a graphene structure formed by the two-step growth C has strong strength. For example, as shown in FIG. 14, a Raman peak in the case of the two-step growth C may be greater than a Raman peak in the case of the fast growth A and the slow growth B. Furthermore, referring again to FIG. 15, a ratio (2D/G) of the 2D peak to the G peak in the case of the two-step growth C may be greater than the ratio (2D/G) of the 2D peak to the G peak in the case of the fast growth A and the slow growth B. For example, the ratio (2D/G) of the 2D peak to the G peak in the case of the two-step growth C may be about 1.5. In addition, the ratios (2D/G) of the 2D peak to the G peak in the case of the fast growth A and the slow growth B may be about 0.15 and about 0.65, respectively. This may mean that a two-step growth method combining fast growth and slow growth may grow high quality graphene having good crystallinity.

FIG. 16 is a table comparing resistance changes of a metal/graphene/substrate structure when graphene is grown on a substrate through fast growth, when graphene is grown on a substrate through slow growth, and when graphene is grown on a substrate through two-step growth combining fast growth and slow growth. For example, the table in FIG. 16 compares resistance changes of a tungsten (W)/graphene (Gr)/silicon (Si) substrate structure.

Referring to FIG. 16, a resistance value before annealing of the W/Gr/Si substrate structure when graphene is grown on a substrate through fast growth may be about 7.09Ω, and a resistance value after annealing may be about 25.65Ω. Thus, in the case of fast growth, a reduction rate of a resistance value of the W/Gr/Si substrate structure may be −261.77%. Meanwhile, a resistance value before annealing of the W/Gr/Si substrate structure when graphene is grown on a substrate through slow growth may be about 7.23Ω, and a resistance value after annealing may be about 26.10Ω. Thus, in the case of slow growth, a reduction rate of a resistance value of the W/Gr/Si substrate structure may be −260.99%. Further, a resistance value before annealing of the W/Gr/Si substrate structure when graphene is grown on a substrate through two-step growth may be about 6.39Ω, and a resistance value after annealing may be about 5.7Ω. Thus, in the case of two-step growth, a reduction rate of a resistance value of the W/Gr/Si substrate structure may be 10.8%.

As shown in the table of FIG. 16, in the case of forming graphene on the substrate through the two-step growth, a resistance value of the W/Gr/Si substrate structure may decrease after annealing. From this, compared to the case of forming graphene on the substrate through only fast growth or slow growth, a semiconductor device having a relatively less resistance value may be formed when graphene is formed on the substrate through two-step growth.

Figure 17:
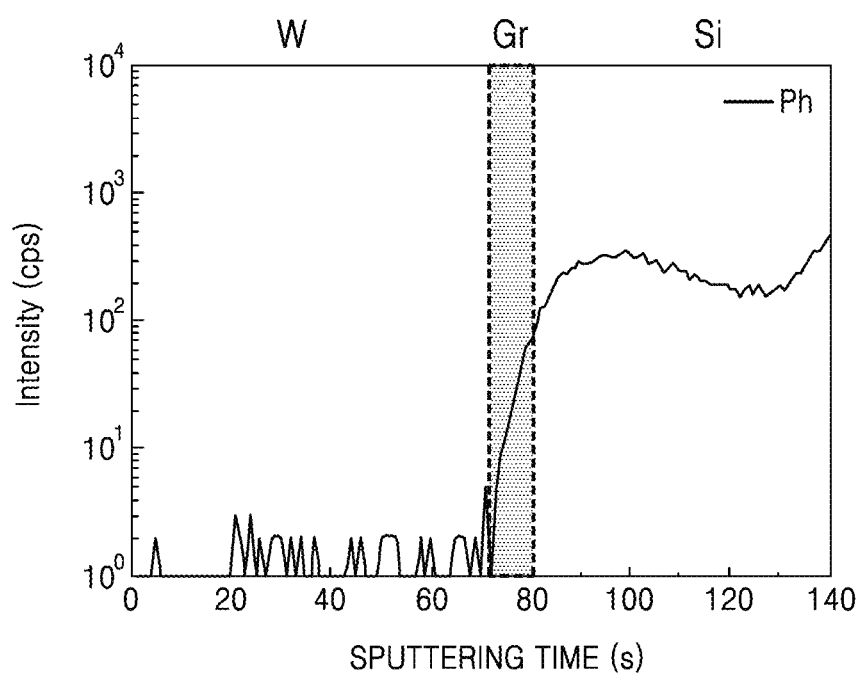
FIG. 17 is a graph showing a dopant blocking effect of graphene when graphene is grown on a substrate through two-step growth combining fast growth and slow growth.

FIG. 17 is a graph showing a dopant blocking effect of graphene when graphene is grown on a substrate through two-step growth combining fast growth and slow growth. The graph of FIG. 17 shows the W/Gr/Si substrate structure, which is sputtered to count dopants protruding from the structure. The result in FIG. 17 appears when the dopants are phosphorous (Ph). In FIG. 17, the vertical axis represents the number of dopants (count per second; cps), and the horizontal axis represents a sputtering time.

Referring to FIG. 17, for about 70 seconds after starting sputtering, the number of Ph released from the structure may be nearly zero. Also, for about 70 seconds to about 80 seconds after starting sputtering, the number of Ph released from the structure may increase rapidly. Furthermore, after about 80 seconds after starting sputtering, the number of Ph released from the structure may be maintained at $10^2$ or more. An interval from the start of sputtering to about 70 seconds may refer to a sputtering time for W. In addition, an interval between about 70 seconds to about 80 seconds after the start of sputtering may refer to a sputtering time for Gr. Furthermore, an interval of 80 seconds after the start of sputtering may refer to a sputtering time for a Si substrate. According to the above results, it can be seen that almost no dopant is present in W, and most of the dopant is present in the Si substrate. From this, it can be seen that Gr formed through step growth may serve as a dopant barrier.

An embodiment according to the disclosure may provide a method of forming a high quality graphene layer having uniform flatness on a substrate.

An embodiment according to the disclosure may provide a method of forming a graphene layer having excellent performance as a metal barrier.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A method of forming graphene, the method comprising:
preparing a substrate in a reaction chamber;
performing a first growth process of growing a plurality of graphene aggregates apart from each other on the substrate at a first growth rate, the first growth process using a reaction gas comprising a carbon source; and
performing a second growth process of forming a graphene layer by growing the plurality of graphene aggregates at a second growth rate slower than the first growth rate, the second growth process using the reaction gas comprising the carbon source, wherein the plurality of graphene aggregates that are grown in the second growth process are grown on the plurality of graphene aggregates formed in the first growth process.

2. The method of claim 1, wherein
the carbon source in the first growth process has a first partial pressure,
the carbon source in the second growth process has a second partial pressure, and
the first partial pressure and the second partial pressure are different from each other.

3. The method of claim 2, wherein the first partial pressure is greater than the second partial pressure.

4. The method of claim 1, wherein a coverage of the plurality of graphene aggregates on the substrate grown in the first growth process is in a range of 10% to 80%.

5. The method of claim 1, wherein the reaction gas further comprises at least one of an inert gas and a hydrogen gas.

6. The method of claim 5, wherein, in the second growth process, at least one of the inert gas and the hydrogen gas is further injected into the reaction chamber.

7. The method of claim 1, wherein a process pressure in the first growth process is less than a process pressure in the second growth process.

8. The method of claim 1, wherein
a process pressure in the first growth process is less than or equal to a process pressure in the second growth process, and
the process pressure in the first growth process and the second growth process is in the range of 0.01 mTorr to about 20 mTorr.

9. The method of claim 1, wherein the first growth process and the second growth process are performed under a plasma enhanced chemical vapor deposition (PECVD) process.

10. The method of claim 9, wherein a plasma in the first growth process and the second growth process is generated by at least one radio frequency (RF) plasma generator or at least one microwave (MW) plasma generator.

11. The method of claim 1, wherein the first growth process and the second growth process are performed at a process temperature of 200° C. to 700° C.

12. The method of claim 1, wherein
the substrate comprises a non-catalyst substrate, and
the non-catalyst substrate does not include a material that is configured to act as a catalyst for growth of graphene aggregates.

13. The method of claim 1, wherein the substrate comprises at least one of a group IV semiconductor material, a semiconductor compound, and an insulating material.

14. The method of claim 13, wherein the substrate further comprises a dopant.

15. The method of claim 1, wherein the substrate comprises a material in which at least two elements are combined among Si, Ge, C, Zn, Cd, Al, Ga, In, B, C, N, P, S, Se, As, Sb, and Te.

16. The method of claim 1, wherein
the substrate comprises an oxide of an element, a nitride of the element, a carbide of the element, or a derivative of the element, and
the element is at least one of Si, Ni, Al, W, Ru, Co, Mn, Ti, Ta, Au, Hf, Zr, Zn, Y, Cr, Cu, Mo, and Gd.

17. The method of claim 1, wherein the carbon source is a hydrocarbon in a liquid state at room temperature.

18. The method of claim 17, wherein the hydrocarbon comprises any one of methane, ethylene, acetylene, and propylene.

19. The method of claim 1, wherein the carbon source comprises at least one of:
a molecular precursor comprising at least one aromatic molecular ring and a precursor comprising a functional group in a molecule having at least one aromatic molecular ring; and
a molecular precursor comprising at least three aliphatic carbon bonds and a precursor comprising a functional group.

20. The method of claim 19, wherein the carbon source comprises at least one of benzene, toluene, meta-xylene, propane, propene, butane, hexane, octane, cyclohexane, oxygen, nitrogen, sulfur, and phosphorus.

21. The method of claim 1, further comprising:
pretreating a surface of the substrate before performing the first growth process.

22. A method of forming graphene, the method comprising:
preparing a substrate in a reaction chamber to provide a prepared substrate; and
forming a graphene layer on the prepared substrate by performing a plurality of growth processes on the prepared substrate in the reaction chamber using a reaction gas comprising a carbon source,
the plurality of growth processes including a first growth process of growing a plurality of graphene aggregates on the prepared substrate at a first growth rate in the reaction chamber using the reaction gas, and
the plurality of growth processes including a second growth process after the first growth process, the second growth process including growing the plurality of aggregates at a second growth rate in the reaction chamber using the reaction gas, the second growth rate being slower than the first growth rate,
wherein the plurality of graphene aggregates that are grown in the second growth process are grown on the plurality of graphene aggregates formed in the first growth process.

23. The method of claim 22, wherein a partial pressure of the carbon source in the first growth process is greater than a partial pressure of the carbon source in the second growth process.

24. The method of claim 22, wherein a process pressure in the first growth process is less than a process pressure in the second growth process.

* * * * *